United States Patent
Long et al.

(10) Patent No.: US 8,565,929 B2
(45) Date of Patent: Oct. 22, 2013

(54) ENHANCED PLANT LEVEL SUPPORT OF GRID RECONSTRUCTION

(75) Inventors: Christopher Eugene Long, Greer, SC (US); Laura Lea Boes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 324 days.

(21) Appl. No.: 12/947,910

(22) Filed: Nov. 17, 2010

(65) Prior Publication Data

US 2012/0123601 A1  May 17, 2012

(51) Int. Cl.
*G06F 19/00* (2011.01)

(52) U.S. Cl.
USPC ........................................................ 700/287

(58) Field of Classification Search
USPC ............. 700/286, 287, 288, 291–295; 290/44
See application file for complete search history.

(56) References Cited

U.S. PATENT DOCUMENTS

| | | | |
|---|---|---|---|
| 4,103,178 A * | 7/1978 | Yannone et al. ............ | 290/40 R |
| 7,394,166 B2 | 7/2008 | Teichmann et al. | |
| 7,536,364 B2 | 5/2009 | Subbu et al. | |
| 2009/0112374 A1 * | 4/2009 | Kirchhof et al. ............. | 700/287 |
| 2010/0100248 A1 * | 4/2010 | Minto et al. ................. | 700/287 |

OTHER PUBLICATIONS

Ketabi et al. "A method for dynamically calculation of load steps during power system restoration" IEEE Canadian Conference on Electrical and Computer Engineering 2000, p. 158-162.*

* cited by examiner

*Primary Examiner* — Sean P. Shechtman
*Assistant Examiner* — Steven Garland
(74) *Attorney, Agent, or Firm* — Dority & Manning, P.A.

(57) ABSTRACT

Methodology is provided for enhancing plant level support for grid reconstruction following a blackout. A plant based grid reconstruction manager develops solutions for reconstruction sequence steps to be carried out automatically or to be communicated to site personnel for manual implementation. The sequence steps are based on high-fidelity modeling of the capabilities all of the power production units present in a power plant and take into consideration grid specified load expectations, ambient conditions including ambient temperature and gas turbine operating levels. The methodology also provides for consideration of possible subsequent steps in the sequence to maximize the ability to pick-up additional load in such subsequent steps.

9 Claims, 2 Drawing Sheets

ENHANCED PLANT LEVEL SUPPORT OF GRID RECONSTRUCTION

FIELD OF THE INVENTION

The present subject matter relates to startup of power plants. More particularly, the present subject matter relates to methods for enhancing the reestablishment of grid power following a power outage.

BACKGROUND OF THE INVENTION

Power generation units operating on a relatively small electrical grid play a significant role in frequency regulation and maintenance. In the event of a regional blackout, individual units or a select group of units may be called upon to help in grid reconstruction. This grid reconstruction process may involve commanded steps in power generation at the unit, block, or plant level while operating in a local grid mode, where the discrete load steps are a calculated approach to supplying power that supports a coordinated demand.

Load step requirements or requests are defined in terms of percentage of Maximum Capacity Rating (MCR) of the individual power generation unit or for the MCR of the plant. An individual power generation unit's load step capability may be limited, however, by unit operability and controllability factors such as the ability to supply fuel fast enough to avoid under speed events driven by the additional power draw or the ability to abruptly add load without transiently exceeding individual power generating unit limits. These constraints are also a function of factors such as ambient conditions and the current operating point for the individual unit.

In view of these known concerns it would be advantageous to provide enhanced positioning and operation of multiple power generation units in preparation for, and then the subsequent scheduling and execution of, actual power generation unit load steps within machine specific capabilities to support grid reconstruction in the event of a blackout. It would also be advantageous to provide a control mechanism that can act automatically or can be configured to report, in an advisory mode, the load step sizes that have acceptable likelihood of success from the current operating point.

BRIEF DESCRIPTION OF THE INVENTION

Aspects and advantages of the invention will be set forth in part in the following description, or may be obvious from the description, or may be learned through practice of the invention.

The present subject matter relates to methodologies provided for enhancing plant level support for grid reconstruction following a blackout. A plant based grid reconstruction manager develops solutions for reconstruction sequence steps to be carried out automatically or to be communicated to site personnel for manual implementation using either deterministic or stochastic solutions of at least one of a mixed integer optimization problem and the equivalent solution of a sequence of continuous variable problems.

In certain embodiments, the sequence steps are based on high-fidelity modeling of the capabilities of the power generation unit present in a power plant and take into consideration grid specific load expectations, external factors (such as ambient temperature, pressure, humidity, fuel composition, etc.) as well as current conditions and operating levels of the generator.

In selected embodiments, the methodology also provides for consideration of possible subsequent steps in the reconstruction sequence steps to maximize the ability to pick-up additional load in such subsequent steps. In additional embodiments, an enhanced sequence of load step instructions includes analysis as to current and future predicted load step capabilities of the plurality of generators and allows for both positioning and re-positioning of individual power generating units to maximize the current load step capabilities for both a current step and one or more future steps in the sequence.

In certain embodiments, the method employs one or more of processors that are already provided and configured to control power plant generators, processors associated with a grid distribution control system, and a dedicated controller or combinations thereof to provide an enhanced sequence of load step instructions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
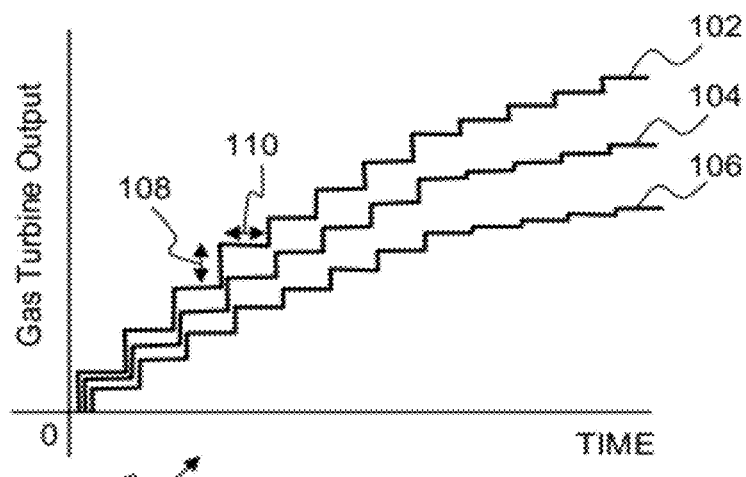
FIG. 1 is an exemplary graph of gas turbine load step capabilities illustrating maximum feasible load step size for an exemplary gas turbine at various ambient temperatures.

Repeat use of reference characters throughout the present specification and appended drawings is intended to represent same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As noted in the Summary section, the present subject matter is directed toward enhancing the re-establishment of grid power following a power outage. In accordance with present technology, a method for automation or advisement of actions in a plants' support of the grid reconstruction process has been provided. The method involves the solution of a complex numerical optimization problem or program in a plant control system that dictates to the unit controls or recommends to the operations team, the enhanced sequence and magnitude of the power production unit's load steps in accordance to the expected operational limitations. Solutions to the optimization problems may be provided by various processors including those already in use for controlling the various operating unit, processors associated with a distribution control system, or a dedicated controller for the application. In some instances, processing may be shared among these and other devices to solve the optimization problems.

The method does not blindly define the load step size for each power production unit in the plant for the current time step, but rather also gives consideration for actions that maximize subsequent load step capabilities. That is to say, the method avoids steps that will unnecessarily constrain the next move. For example, the method may call upon a first power generating unit to actually reduce it's output while calling upon a second power generating unit to increases it's output knowing that in future steps, the first power generating unit will be better positioned to take on additional load including being able to provide additional output more rapidly than other power generating units within the power plant.

In accordance with present technology, the method optimally positions units around exclusion zones and intentionally avoids high-risk maneuvers such as pushing multiple units through transitory disturbances simultaneously or calling for units to unload back through mode transfer points. For example, the following exemplary embodiments of the present subject matter may include a gas turbine whose operating space may be modeled to identify operating points that could be preferentially excluded as end points or load steps that may pose an increased risk to system stability.

With reference now to FIG. 1, there is illustrated a graph 100 of exemplary load step capabilities illustrating maximum feasible load step size for an exemplary gas turbine power production unit. Again, it should be appreciated that the present technology may be applied to power plants including power generating units other than gas turbines and many include combinations of diverse power generating units.

Graph 100 illustrates load step capabilities over time, generally in terms of minutes, and steps in terms of turbine output capabilities, generally in terms of megawatts. It should also be appreciated by those of ordinary skill in the art that such turbine capabilities are also dependant on ambient temperature. Such temperature dependency is illustrated by separate lines representing an ambient temperature of 0° F. at line 102, 60° F. at line 104, and 120° F. at line 106. Vertical line 108 representatively illustrates a maximum load step capability at current conditions. Horizontal line 110 representatively illustrates a settling time required between each load step. Graph 100 is illustrative of exemplary capabilities of turbine generators capable of producing up to about 300 megawatts (MW).

It should be appreciated that in addition to ambient temperature, other ambient condition such as, without limitation, ambient pressure, humidity, fuel composition, wind speed for wind turbine applications, cloud cover for solar application, etc may also be monitored depending on the type and mix of power production units employed.

Generally these operational characteristics and capabilities can be determined in real-time in a control system using a high-fidelity, unit specific, model for each of a plurality of power production units within the power plant That is, a model for individual power generating units is provided as opposed to, for example, a generic model for the type of power generating unit installed be it a gas turbine or other type of power generating unit. Once determined, these operational characteristics and capabilities can then be utilized to map out a complete operating space.

A supervisory controller aware of the conditions of operation can then formulate and solve an optimization problem to yield an enhanced scheduling sequence of load steps such that the plant or site meets the current external load step requests. New power production unit load setpoints can then either be routed directly to the unit control systems 210, 212, 214, 216, 218, 220 via control lines 206 for implementation or provided in an advisory mode to an on-site operations team that is supporting the grid reconstruction effort depending on the operational mode specified by Supervisory Control Layer 208.

Figure 2:
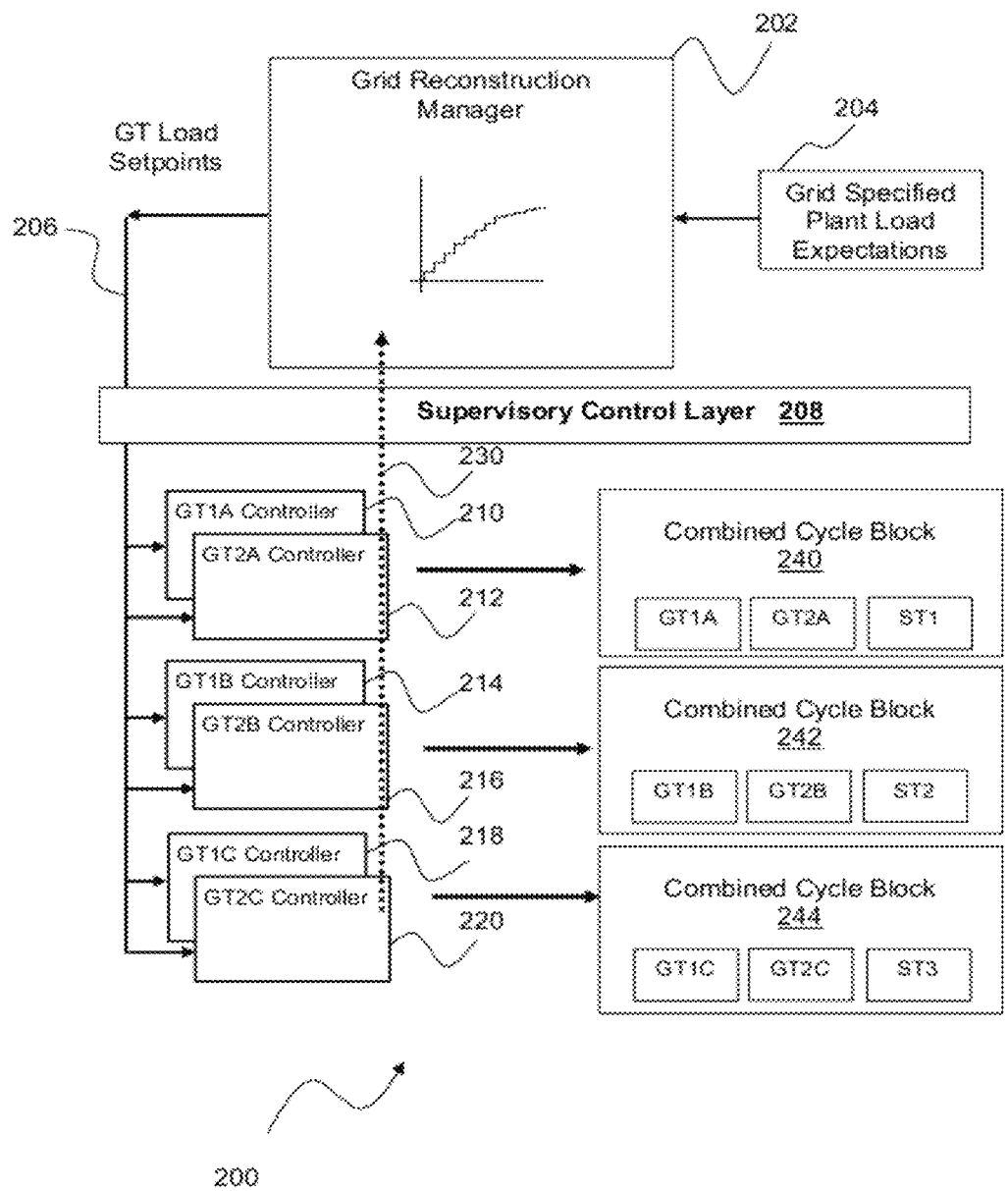
FIG. 2 illustrates an exemplary power plant being controlled by methodology in accordance with present technology.

With reference now to FIG. 2, there is illustrated an exemplary power plant 200 being controlled by methodology in accordance with present technology. In particular, following a blackout, an individual power plant such as illustrated in FIG. 2 may receive communications from other grid controlling locations outlining grid specific plant load expectations 204 that are being sought as a part of a grid recovery or reconstruction effort. Power plant 200, in accordance with present technology, may be provided with a grid reconstruction manager 202 corresponding to hardware and/or software implementations of the present technology.

In operation grid reconstruction manager 202 has available information including such as gas turbine load step capabilities previously described with respect to FIG. 1 and modeling information appropriate to each of the gas turbines GT1A, GT2A, GT1B, GT2B, GT1C, GT2C and steam turbines ST1, ST2, ST3 present at the plant. A recovery Supervisory Control Layer 208 may be implemented as an algorithm operating in conjunction with grid reconstruction manager 202 to control implementation of the choice of automatic control of, for example, gas turbine load setpoints via communication line 206 to gas turbine controllers 210, 212, 214, 216, 218, 220 or communication of individual control steps for manual implementation by site personnel. Command responses from turbine controllers 210, 212, 214, 216, 218, 220 may be relayed back to grid reconstruction manager 202 by way of communication line 230. The information sent back to grid reconstruction manager 202 includes the current load levels of the generators, as well as a modeled indication of the state of the machine, that is, the degree of fouling or degradation, as it impacts load step capability.

In the exemplary configuration illustrated in FIG. 2, the exhaust energy from paired gas turbines GT1 and GT2 A-C for each of combined cycle blocks 240, 242, 244 is used to supply steam to it shared steam turbine ST1, ST2, ST3, respectively. It should be appreciated that while the present exemplary embodiment is illustrated in the context of six gas turbines configured in pairs to supply energy to three steam turbines, the present technology is equally applicable to any number of power generating units. Further, it should be appreciated that a mix of power generating units may be provided so that all the units in one power plant may or may not be of the same type.

In accordance with present technology, enhancement of a plant restart following a blackout as a part of a grid reconstruction involves solving a mixed integer optimization problem, or providing the equivalent solution of a sequence of continuous variable problems, or may be accomplished by solving other types of optimization problems. Further, solutions for such problems may involve either deterministic or stochastic solutions. After the current ambient conditions, the current output level of all power generating units in the area and other information as discussed above is supplied to grid reconstruction manager 202 via communications line 230, grid reconstruction manager 202 computes a solution, based on the externally commanded or requested load expectations 204, that prescribes new gas turbine output setpoints that satisfy the step request and also maximizes the ability to pick-up additional load in subsequent steps. The set of prescribed set points also takes into consideration aspects such as operational placement of the multiple power generating units through load steps or re-positioning so as to maximize not only the current load step capability but also future predicted load step capabilities for a number of future steps.

Figure 3:
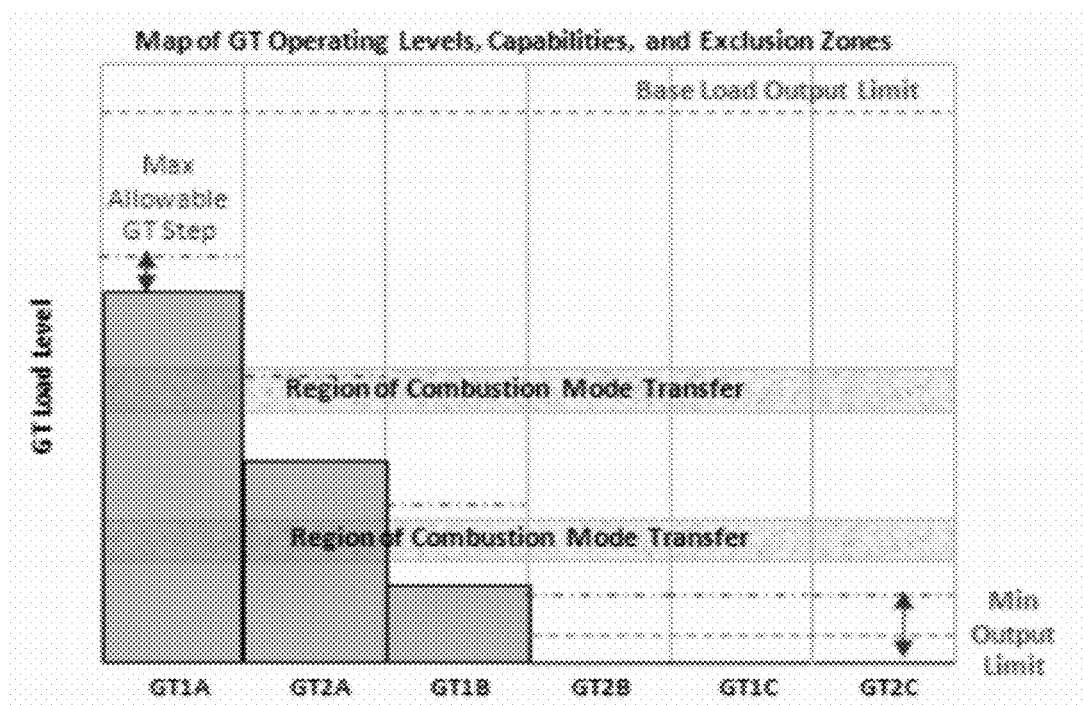
FIG. 3 is a map of exemplary Gas Turbine output levels, capabilities and exclusion zones.

With reference to FIG. 3, there is illustrated a map of exemplary Gas Turbine output levels, capabilities and exclusion zones for exemplary gas turbines GT1A, GT2A, GT1B, GT2B, GT1C, GT2C representatively illustrated as paired components of combined cycle blocks 240, 242, 244 (FIG. 2) together with associated steam turbines ST1, ST2, ST3. Knowledge of these capabilities and characteristics of the various gas turbines within the power plant provide information to the grid reconstruction manager 202 to evaluate capabilities for subsequent steps in the reconstruction process.

An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The technical effect of the executable code is to facilitate prediction and optimization of modeled devices and systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for enhancing support of grid reconstruction following a blackout, comprising:
providing a power plant including a plurality of generators;
providing an operational model for each of the plurality of generators within the plant, the model providing at least load step capabilities for each of the plurality of generators;
receiving grid specified plant load expectations;
analyzing the modeled capabilities of each of the plurality of generators; and
providing an enhanced sequence of load step instructions for each of the plurality of generators to respond to the grid specified current and anticipated future plant load expectations;
wherein the enhanced sequence of load step instructions for current plant loads is modified by anticipated future plant load expectations to make a configuration of the plurality of generators available to provide a more rapid response to anticipated future plant loads; and
wherein providing an enhanced sequence of load step instructions comprises solving at least one of mixed integer optimization representations of generator characteristics and a sequence of continuous variable representations of generator characteristics, and wherein analyzing comprises solving the selected representation using one of a deterministic or stochastic solution.

2. The method of claim 1, further comprising:
monitoring external factors within the plant; and
providing the enhanced sequence of load step instructions based at least in part on selected ones of the external factors.

3. The method of claim 1, further comprising:
monitoring generator operating conditions of each generator within the plant; and
providing the enhanced sequence of load step instructions based at least in part on the operating conditions.

4. The method of claim 1, further comprising:
transmitting instructions to selected generators within the plant to implement the enhanced sequence of load step instructions.

5. The method of claim 4, wherein transmitting comprises automatically transmitting instructions to selected generator controllers.

6. The method of claim 4, wherein transmitting comprises transmitting instructions for manual entry of instructions for selected generator controllers.

7. The method of claim 1, wherein providing an enhanced sequence of load step instructions comprises employing one or more of processors configured to control power plant generators, processors associated with a grid distribution control system, and a dedicated controller or combinations thereof to provide an optimized sequence of load step instructions.

8. A method for enhancing support of grid reconstruction following a blackout, comprising:
providing a power plant including a plurality of generators;
providing an operational model for each of the plurality of generators within the plant, the model providing at least load step capabilities for each of the plurality of generators;
receiving grid specified plant load expectations;
analyzing the modeled capabilities of each of the plurality of generators;
providing an enhanced sequence of load step instructions for each of the plurality of generators to respond to the grid specified plant load expectations; and
further comprising:
analyzing the modeled capabilities of each of the plurality of generators to determine each generator's ability to provide additional load support in subsequent steps,
wherein the step of providing an enhanced sequence of load step instructions is based at least in part on the determined abilities to provide additional load support in subsequent steps.

9. A method for enhancing support of grid reconstruction following a blackout, comprising:
providing a power plant including a plurality of generators;
providing an operational model for each of the plurality of generators within the plant, the model providing at least load step capabilities for each of the plurality of generators;
receiving grid specified plant load expectations;
analyzing the modeled capabilities of each of the plurality of generators;
providing an enhanced sequence of load step instructions for each of the plurality of generators to respond to the grid specified plant load expectations; and
wherein the enhanced sequence of load step instructions includes analysis as to current and future predicted load step capabilities of the plurality of generators and allows for both positioning and re-positioning of individual power generating units to maximize the current load step capabilities for both a current step and one or more future steps in the sequence.

* * * * *